United States Patent
Netravalkar et al.

(10) Patent No.: US 12,271,378 B2
(45) Date of Patent: Apr. 8, 2025

(54) UBIQUITOUS SEARCH ON DATA STORED IN THE RDBMS

(71) Applicant: Oracle International Corporation, Redwood Shores, CA (US)

(72) Inventors: Saurabh Naresh Netravalkar, Santa Clara, CA (US); Aleksandra Czarlinska, San Jose, CA (US); Zhen Hua Liu, San Mateo, CA (US); Beda Christoph Hammerschmidt, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/367,722

(22) Filed: Sep. 13, 2023

(65) Prior Publication Data
US 2024/0378199 A1    Nov. 14, 2024

Related U.S. Application Data

(60) Provisional application No. 63/465,426, filed on May 10, 2023.

(51) Int. Cl.
*G06F 16/20*    (2019.01)
*G06F 16/2453*    (2019.01)

(52) U.S. Cl.
CPC .. *G06F 16/24539* (2019.01); *G06F 16/24537* (2019.01)

(58) Field of Classification Search
CPC ............... G06F 16/24539; G06F 16/24537
See application file for complete search history.

(56) References Cited

U.S. PATENT DOCUMENTS

| | | | |
|---|---|---|---|
| 11,836,146 B1 * | 12/2023 | Pathak | H04L 43/04 |
| 2014/0280047 A1 * | 9/2014 | Shukla | G06F 16/24554 |
| | | | 707/769 |
| 2020/0334254 A1 | 10/2020 | Arye et al. | |
| 2022/0092069 A1 * | 3/2022 | Hartsing | G06F 16/24544 |

OTHER PUBLICATIONS

Shao et al., "Efficient keyword search over virtual XML views", VLDB Journal, Springer Verlag, Berlin, DE, vol. 18, No. Spec. Iss, Apr. 1, 2009, 28 pages.

(Continued)

*Primary Examiner* — Kristopher Andersen
(74) *Attorney, Agent, or Firm* — Hickman Becker Bingham Ledesma LLP (57) ABSTRACT

Techniques are provided for creating a "ubiquitous search index" which allows for full-text as well as value range-based search across all columns from multiple database tables, multiple user-defined unmaterialized views, and external sources. In one implementation, the data is indexed in a peculiarly constructed schema-based JSON format without duplicating data. The techniques maintain eventual consistency with the normalized source of truth database tables, and do not have a significant impact on the performance of transactional Data Manipulation Language (DML) operations.

20 Claims, 4 Drawing Sheets

(56) References Cited

OTHER PUBLICATIONS

Mistry et al., "Materialized View Selection and Maintenance Using Multi-Query Optimization", arxiv.org, Cornell University Library, 201, Olin Library Cornell University Ithaca, NY 14853, Mar. 2, 2020, 22 pages.
Anonymous, "Transforming and Indexing Custom JSON, Apache Solr Reference Guide 6.6", Jun. 9, 2017, Retrieved from the Internet: URL:https://solr.apache.org/guide/6_6/transforming-and-indexing-custom-json.html, 9 pages.
Anonymous, "MySQL: Return JSON from a standard SQL Query—Database Administrators Stack Exchange", Nov. 5, 2021, Retrieved from the Internet: https://dba.stackexchange.com/questions/192208/mysql-return-json-from-a-standard-sql-query.

\* cited by examiner

UBIQUITOUS SEARCH ON DATA STORED IN THE RDBMS

CROSS-REFERENCE TO RELATED APPLICATIONS; BENEFIT CLAIM

This application claims the benefit of Provisional Application 63/465,426, filed May 10, 2023 the entire contents of which is hereby incorporated by reference as if fully set forth herein, under 35 U.S.C. § 119(e).

FIELD OF THE INVENTION

The present invention relates to database systems and, more specifically, techniques for performing multi-target search operations on data that may originate from heterogeneous external and/or internal sources.

BACKGROUND

An inverted index is a data structure that maps content (such as words or numbers) to its locations in a table, document, or set of documents. A general description of inverted indexes can be found at en.wikipedia.org/wiki/Inverted_index, the content of which is incorporated herein by this reference.

Inverted indexes are a key indexing structure to enable efficient information retrieval. Consequently, inverted indexes are supported and available as a text index in many relational database management system (RDBMS) products. Specifically, many RDBMS systems have some form of an inverted indexing capability to allow users to perform full-text search on semi-structured data (e.g., XML, JSON, etc.) and unstructured data (e.g., Text documents, Doc files, PDFs, Web URL Contents, etc.).

For relational value-based columns, typical RDBMS systems have capabilities of multiple indexing types like B-Trees, Bitmap Indexes, etc. Many database applications have their data normalized in separate tables for efficient data manipulation language (DML) operations, and source of truth maintenance. However, search requirements are usually across multiple tables.

In a traditional scenario, when a search across multiple columns or multiple tables (a "multi-target search") is involved, a SQL query comprising of several complex joins and multiple conditional clauses needs to be constructed. Such queries are referred to herein as "multi-target queries". Conventionally, for each table access of a multi-target query, a query optimizer within the RDBMS can use at-most one single index to retrieve data from one target, and process other conditional clauses of the multi-target query as a post-processing step to retrieve data from other targets, one row at a time. This tremendously hampers performance.

In order to avoid this scenario, some database applications transform their data by encapsulating, into a single materialized view, the join relationships of data across multiple tables they wish to search on. Unfortunately, this duplicates the data, with one copy of each data item in one of the base tables and another copy in the materialized view. Further, for many materialized views, the overhead associated with keeping the copies in sync is significant.

Another option is to export the data from the multiple targets to an external search tool. Unfortunately, this also duplicates the data and incurs synchronization overhead. With both the materialized view approach and the external search tool approach, there is massive storage overheads and the pain of maintaining additional application logic to keep both data copies in SYNC with each other, potentially across different heterogenous sources.

Another difficulty faced by RDMS system is how to index remote data (data external to the RDBMS), such as remote files and remote URLs. Current approaches involve bringing the data into the RDBMS and creating indexes on top of the database structures (e.g., tables) into which the external data is loaded. Unfortunately, this too involves data duplication. Databases do provide mechanisms like external tables to allow search operations on remote data without duplication of data, but current external table implementations do not support creation of indexes, and queries that target data from external tables are extremely non-performant. Similarly, there is no mechanism for textual type of search on external tables.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein for creating a "ubiquitous search index" which allows for full-text as well as value range-based search across all columns from multiple database tables and multiple user-defined views. The techniques involve indexing heterogeneous sources (e.g., relational tables, materialized and non-materialized views, and external sources) as if each source were a collection of JSON objects. Specifically:

each source is treated as a collection of source-rows,
each source-row is converted into a JSON object for the purpose of indexing, and
each JSON object thus created is indexed, then discarded.

Thus, the index appears to index a collection of JSON objects, while the nature of the actual indexed sources may be significantly different from JSON and from each other.

The index may be used to identify the source-rows that satisfy search criteria specified in many types of queries. The metadata for the source-rows may be used to retrieve search-criteria-matching elements from the underlying sources, or to construct and manipulate JSON objects that are created based on search-criteria-matching elements retrieved from the underlying sources.

In one implementation, the data is indexed in a peculiarly constructed schema-based JSON format without duplicating data. Further, the techniques allow users to add their external tables to the ubiquitous index and enable arbitrary search operations on remote non-database sourced data (e.g., non-database sourced data like Hadoop files, remote URLs, etc.) without persisting the entire data itself within the database.

The ubiquitous search techniques described hereafter avoid heterogenous product interactions, do not involve duplication or denormalization of data, and efficiently index data in a searchable transformed format on the fly. The techniques maintain eventual consistency with the normalized source of truth database tables, and do not have a significant impact on the performance of transactional Data Manipulation Language (DML) operations.

In one implementation, searches can be performed in a variety of ways, including: (a) traditional SQL queries performed directly on top of the Ubiquitous Index, and (b) through an interface (e.g., implemented as a PL/SQL package) which possesses procedures accepting query input in a very user-intuitive No-SQL style JSON format Query Language (referred to herein as "Oracle SODA"). Thus, users get the best of both worlds, the ACID properties and optimal minimal normalized storage of data within the RDBMS and at the same time, No-SQL style highly functionally rich querying capabilities all within the RDBMS itself.

The ubiquitous search system described hereafter transforms and indexes data on the fly into the search index, directly into indexing structures, only persisting the minimal metadata i.e., primary key and data source name information (table or view name whose row is being indexed). Similarly, the system does not need application developers to maintain separate application logic for synchronization of the search index (potentially residing outside the database as part of a separate search solution) with the original database tables, as they system autonomously tracks DMLs on the original tables and maintains eventual consistency model with the ubiquitous index within the database itself not requiring any separate search solution.

In one implementation, virtually any source of data may be indexed within the database system by transforming the data into a search amenable format (JSON business objects) and by creating flexible non-materialized views, and then adding them to a single ubiquitous search index. In some implementations, the single index (which may index any number of columns/fields) may be used in place of having multiple indexes directly on database tables, which significantly slows down DML operations.

Using the techniques described herein, one single ubiquitous index that is de-coupled from the database tables themselves uses queueing logic combined with background jobs, to track DMLs and update the ubiquitous index in an asynchronous way thus, boosting performance of DML operations in turn speeding up data ingestion rate.

In one implementation, within the ubiquitous index, each data source has its indexed data in a separate partition. Hence, applications can perform fast localized search within a single data source by using a single partition of the index and at the same time also perform parallelized global search across the database by searching across all partitions.

Using these techniques, documents are transformed into a JSON consisting of the data source name as the key and its object contains an enlisting of each column of the data source, with its datatype retained. Each field of this JSON is then indexed both into the textual inverted index as well as in other indexing structures amenable for value based and range-based searching. Hence, under a single index, entire data along with datatype preserved, can be used for both textual as well as range-based searching at the same time in flexible ways greatly boosting the answerability of highly complex analytical and transactional application questions by being transformed into a single index access SQL or PL/SQL query.

In one implementation, a PL/SQL API is provided for queries includes user intuitive NoSQL style JSON query specification formats in Oracle SODA QBE syntax. Oracle SODA QBE syntax is described, for example, at docs.oracle.com/en/database/oracle/simple-oracle-document-access/adsdi/overview-soda.html, the entire contents of which are incorporated herein by reference. Consequently, the techniques provided herein provide a unique best of both worlds, by storing and indexing data within the highly robust RDBMS and using REST/Application Wrappers on top of a PL/SQL API to query the ubiquitous index using NoSQL style complex search queries.

Sources

As used herein, the term "source" refers to anything that contains data for which a user may search. Thus, sources may be "internal" or "external" to a database system. Examples of internal sources include, but are not limited to, tables, materialized views, unmaterialized views, etc. Examples of external sources include, but are not limited to web pages, text documents, containers within other database systems or repositories, etc. The search index described herein is referred to as "ubiquitous" because it may be used to search across data from all such sources, as shall be described in detail hereafter. Sources that are indexed by the ubiquitous index are referred to herein as "indexed sources".

Conventional relational tables are organized as rows, where each row has a set of values for the columns of the table. However, other types of sources, such as web pages, may not be organized in this fashion. According to one implementation, all sources are treated as if they are organized into rows for the purposes of searching. In such an embodiment, a "source-row" is any an indexable unit of data, from an indexed source, that is associated with uniquely identifying information.

System Overview

Figure 1:
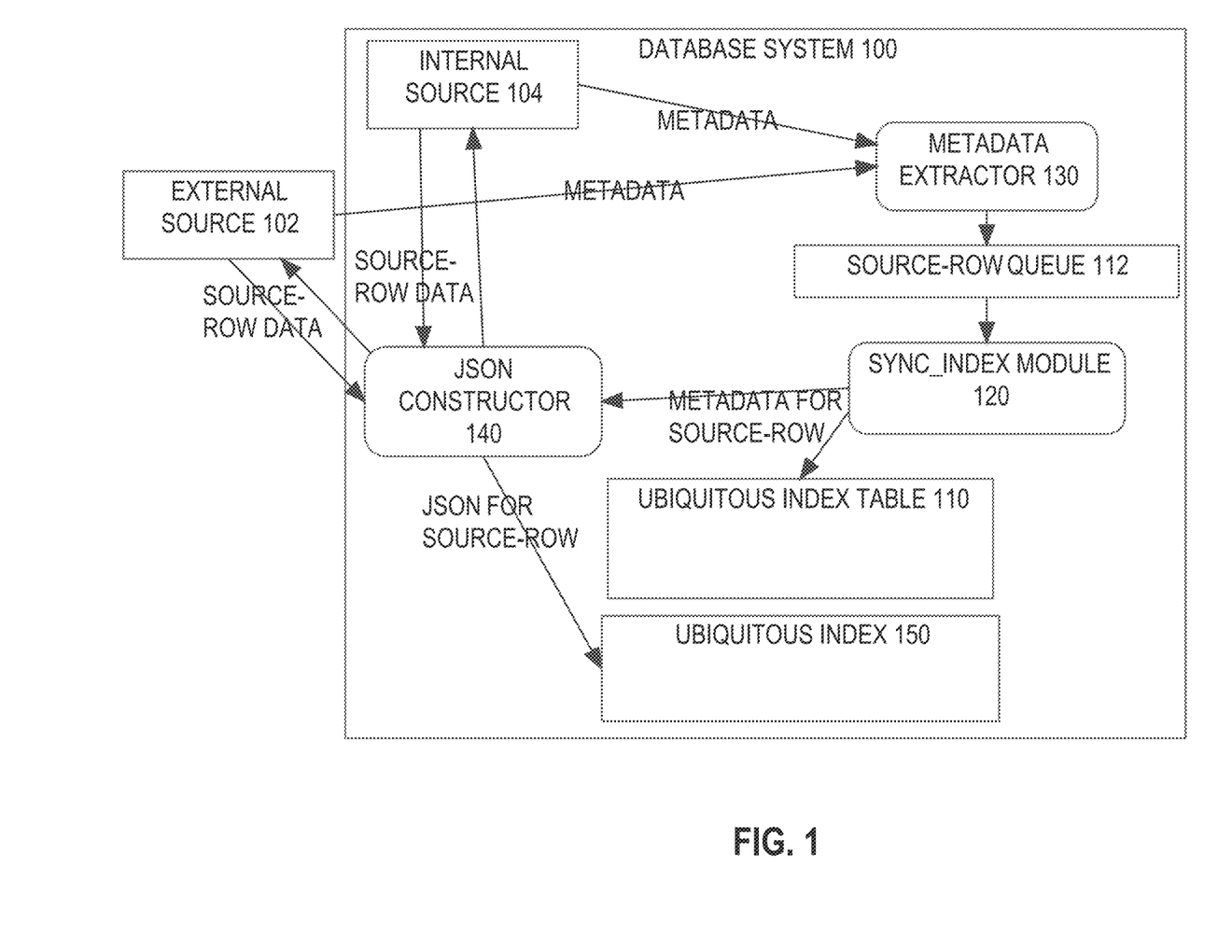
FIG. 1 is a block diagram of a database system that includes components for enabling the database system to be used for ubiquitous searches across both internal and external sources, according to one implementation.

FIG. 1 is a block diagram of a database system 100 that includes components for enabling the database system 100 to be used for ubiquitous searches across both internal and external sources, according to one implementation. Database system 100 includes a metadata extractor 130 for extracting metadata from both internal and external sources (represented by external source 102 and internal source 104). In one implementation, the metadata is extracted on a per-source-row basis. Metadata extractor 130 feeds the source-row metadata from the various sources to a source-row queue 112.

Periodically, a SYNC_INDEX module 120 reads entries from source-row queue 112 and inserts rows that correspond to those entries into a ubiquitous index table 110. A ubiquitous index 150 is built on UI table 110 and is maintained in sync with the contents of UI table 110. In the illustrated implementation, the ubiquitous index 150 is created by:

- Obtaining metadata for a target source-row from ubiquitous index table 110
- Sending the metadata to a JSON constructor 140
- Causing JSON constructor 140 to obtain values for the target source-row from the appropriate source
- Causing JSON constructor 140 to create a JSON object that includes both the metadata for the target source-row and the values for the target source-row
- Indexing, within the ubiquitous index 150, the target source-row based on the JSON object for the target source-row In one implementation, JSON constructor 140 is a component that:

- queries an indexed source for information from a source-row
- constructs a virtual JSON document representing the source-row
- returns the virtual JSON for indexing Once all source-rows for all sources are indexed by ubiquitous index 150, the database system 100 uses index 150 to respond to queries that target any or all of the sources from which metadata has been extracted. Depending on the information requested by the queries, the JSON constructor 140 may be used to produce, from those sources, JSON objects that contain the data that answers the search queries. Each of the components of database system 100 shall be described in greater detail hereafter.

Indexed Sources

Figure 2:
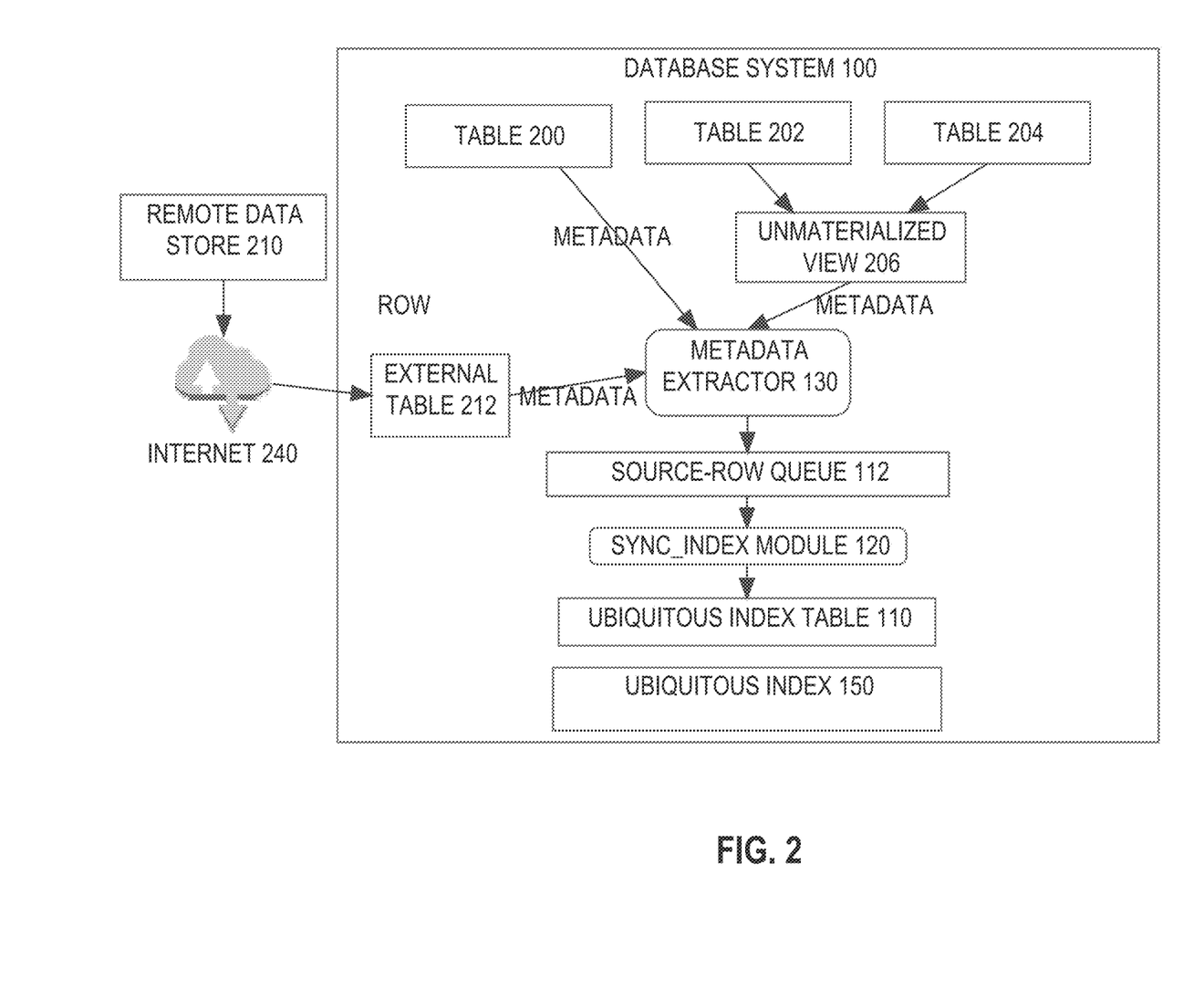
FIG. 2 is a block diagram that illustrates various types of indexed sources, according to an implementation.

FIG. 2 is a block diagram that illustrates various types of indexed sources. Referring to FIG. 2, it illustrates a scenario in which the indexed sources include a relational database table 200, an unmaterialized view 206, and a remote data store 210.

Table 200 represents any table that is internal to database system 100. For the purposes of explanation, the indexed sources include a single relational table. However, in actual implementations, the indexed sources may include any number of relational database tables.

Unmaterialized view 206 is a view created via a join between two relational tables 202 and 204. Because view 206 is unmaterialized, view 206 does not duplicate the data from tables 202 and 204. The indexed sources may include any number of such views. Further, the logic defining such views may be arbitrarily complex, involving joins between any number of base tables.

As mentioned above, remote data store 210 may take many forms. For example, remote data store 210 may be a URL, a file store, etc. The techniques described herein are not limited to any particular type or number of remote data stores. A single remote data store 210 is illustrated for the purpose of explanation. In the illustrated implementation, remote data store 210 is accessible to database system 100 over the Internet 240. External table 212 is a data structure within database system 100 that internally represents remote data store 210. External table 212 typically contains information about remote data store 210 without duplicating the data stored within remote data store 210. For the purpose of searches and indexing, database system 100 treats external table 212 as if it were an internal table. However, to satisfy queries that target external table 212, the database system 100 may ultimately have to retrieve requested data from remote data source 210 over the Internet 240.

The indexed sources illustrated in FIG. 2 are merely examples of the types of sources that may be indexed by ubiquitous index 150. The techniques described herein are not limited to any particular types of sources. For example, the sources may include materialized views as well as unmaterialized views.

Metadata Extractor

Metadata extractor 130 generally represents any mechanism capable of extracting metadata from indexed sources. In one implementation, metadata extractor 130 is implemented for internal indexed sources by DML Triggers/Callbacks created on top of the internal indexed sources (e.g., tables, views, and materialized views). In such an implementation, for example, table 200 may be associated with a trigger that causes entries to be added to source-row queue 112 every time a DML operation is performed on table 200. Similarly, tables 202 and 204 may be associated with triggers that cause entries to be added to source-row queue 112 every time a DML operation that would affect the contents of view 206 is performed on one of the base tables 202 and 204 of view 206.

While DML triggers may be used to track source-row changes made by DML operations, metadata extractor 130 may use a different mechanism for the initial indexing operation performed for a source. For example, assume that a user adds a pre-existing table with 10,000 rows to the ubiquitous index. In this scenario, the metadata extractor may extract the metadata from each of the 10,000 rows and store 10,000 corresponding entries in the source-row queue 112. Similarly, when an external source is initially indexed by the ubiquitous index, an external tool may send to the database server the metadata for each of the to-be-indexed elements of the external source.

Ubiquitous Index Source Row Queue

Source-row queue 112 generally represents a repository for temporarily storing metadata, extracted from indexed sources, for source-rows. In one implementation, each entry in source-row queue 112 corresponds to a single source-row from one of the sources, and includes, in a JSON form:

- Source identification information, and
- Row identification information

The "source identification information" is information that identifies the source of the source-row that corresponds to the entry. For example, assume that table 200 is a "customers" table that is owned by "Scott". Under these circumstances, each entry in Source-row queue 112 that is associated with a row from table 200 may have the source identification information {"owner": "Scott", "source": "customers", . . . }

The "row identification information" is information the uniquely identifies a row within a source. Because the row identification information uniquely identifies a row, the row identification is analogous to a "primary key" of a source. Similar to the primary key of a relational table, the row identification information for a row may be a single value, or a combination of key values that collectively uniquely identify the row. The nature of the primary key may vary based on the nature of the source from which the row was extracted.

For the purpose of illustration, it shall be assumed that the primary key of table 200 is "cust_id". Thus, the row identification information for a queue entry for a row from table 200 may have the row identification information "key":

{"cust_id"=4}. In this case, the entry for the row within source-row queue 112 may be {"owner": "Scott", "source": "customers", "key": {"cust_id"=4}}.

Significantly, the information in the queue entry for a changed source-row uniquely identifies the source-row to which the entry corresponds, but does not actually contain any other values from the source-row. For example, if a new row is inserted into internal source 104, the entry for the row in source-row queue 112 will have metadata that uniquely identifies the source and the row, but not any other values from the newly inserted row.

The SYNC_INDEX Module

SYNC_INDEX module 120 generally represents any mechanism capable of keeping UI table 110 "eventually consistent" with changes that occur at the indexed sources. In one implementation, SYNC_INDEX module 120 is a set of background jobs (one background job per index partition) within database system 100. Each background job periodically (e.g., once every three seconds) performs the following operations relative to its corresponding index partition:
  Fetch metadata (primary keys) for each changed row from the source-row queue 112
  Update the UI table 110 based on the metadata
  Commit the changes to the UI table 110
  Synchronize the corresponding ubiquitous JSON search index partition to reflect the update to the UI table 110

The structure of UI table 110 and the process of synchronizing the UI table 110 with ubiquitous index 150 shall be described hereafter in greater detail.

The UI Table

In one implementation, the UI table 110 includes one UI-table-row per source-row. One column of the UI table 110 is a JSON-type column for storing the metadata that uniquely identifies the source-row associated with the UI-table-row. For the purpose of illustration, the JSON-type column that stores metadata for each source-row shall be referred to herein as the METADATA column.

Beyond the metadata needed to uniquely identify a particular source-row of a particular indexed source, UI table 110 does not include values from other fields of the corresponding source-row. Consequently, the data from the indexed sources is not duplicated in UI table 110, saving significant space and synchronization overhead.

Further, the UI table entries for all indexed sources have the same format. This is true even if the indexed sources themselves differ from each other in other ways, such as number and data-type of fields, whether the sources are internal or external, whether the indexed sources are files, views, or relational tables, etc. Because UI table entries have the same format, regardless of source, database system 100 is able to index the UI table 110 in a manner that allows an indexed search across all indexed sources (or any subset thereof).

For the purpose of illustration, assume that the UI table 110 includes a UI-table-row that corresponds to the source-row, within table 200, where cust_id equals "4". Within that UI-table-row, the METADATA column may contain the following JSON object: {"owner": "Scott", "source": "customers", "key": {"cust_id"=4}}. Significantly, this is the same information for a source-row that is contained in the entries of source-row queue 112. Thus, just as the queue entries do not duplicate the non-primary-key values of source-rows, neither do the corresponding UI-table-rows.

Figure 3:
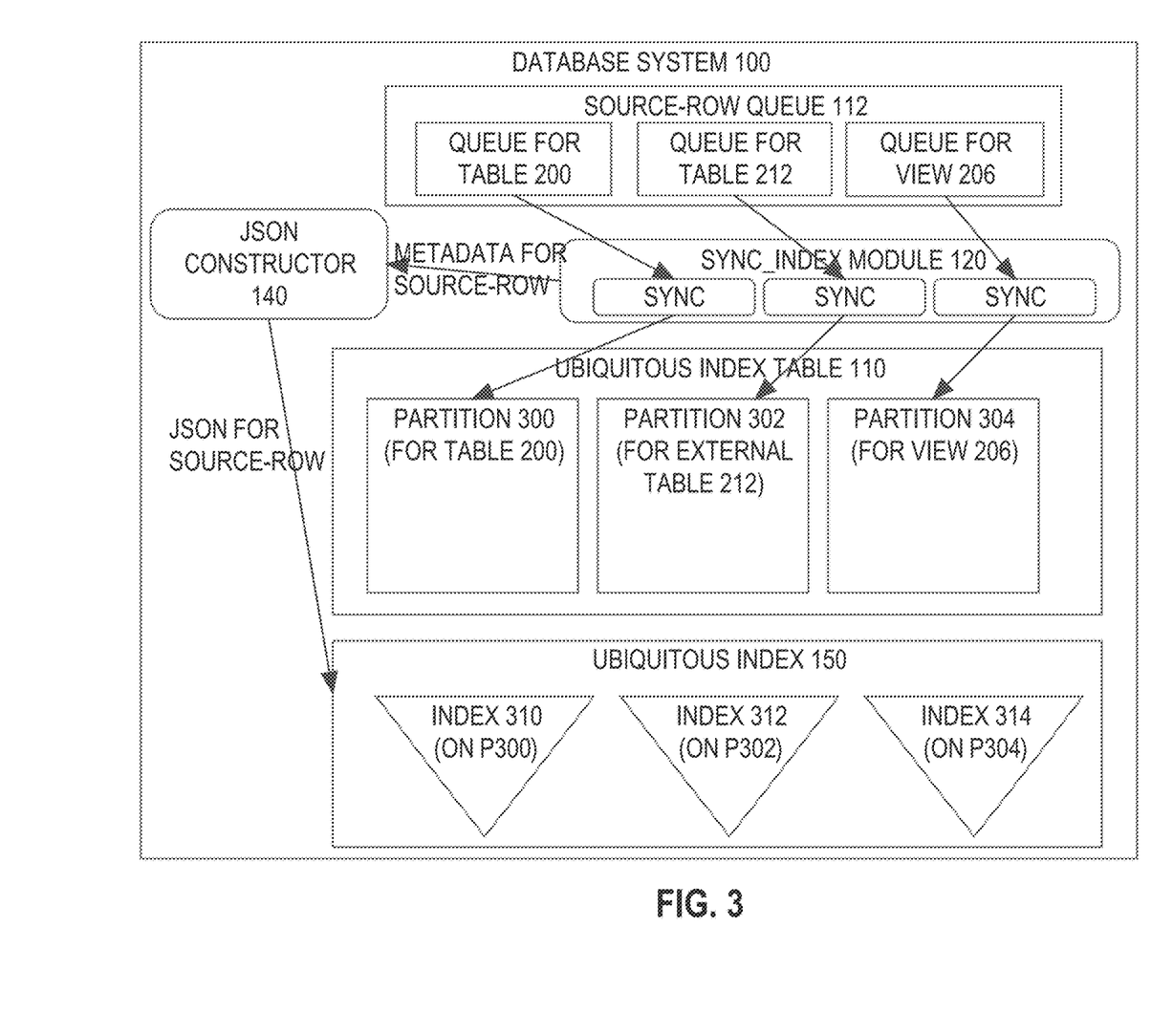
FIG. 3 is a block diagram of a database system with a ubiquitous search index in which each source has a distinct partition of the ubiquitous index table, a distinct JSON search index, and a distinct synchronization job, according to an embodiment.

According to one implementation, the UI table 110 is partitioned, where each partition corresponds to a distinct indexed source. FIG. 3 is a block diagram of such an implementation. Referring to FIG. 3, UI table 110 has three partitions 300, 302 and 304 that correspond to table 200, external table 212, and view 206, respectively. All UI-table-rows added by SYNC_INDEX module 120 to table 110 for source-rows of table 200 are stored in partition 300. Similarly, all UI-table-rows added by SYNC_INDEX module 120 to table 110 for source-rows of external table 212 are stored in partition 302. All UI-table-rows added by SYNC_INDEX module 120 to table 110 for source-rows of view 206 are stored in partition 304. By partitioning the UI table 110 in this manner, sources (and their corresponding source-specific indexes) can be easily added and dropped from the ubiquitous index. In addition, the partitioning of UI table 110 and the maintenance of source-specific indexes facilitates:
  parallelism at query time (a single search request may cause each source-specific index to be searched in parallel), and
  query handling for queries that have conditions that limit the indexed sources to be searched The ubiquitous index and source-specific tables shall now be described in greater detail.

The Ubiquitous Index

In one implementation, the ubiquitous index 150 includes a collection of JSON search indexes that appear, at the application layer, as a single JSON search index. The JSON search index is a flexible index which indexes all the content of a JSON document collection for both full text search (known as keyword searches) using json_textcontains( ) predicates, and scalar value range search using json_exists( ) and json_value( ) predicates. Additionally, it can be used for maintaining an up-to-date JSON dataguide describing the schema of the JSON document collection. JSON search indexes are described in detail in a variety of sources, including but not limited to:
  blogs.oracle.com/database/post/search-indexes-for-json
  docs.oracle.com/en/database/oracle/oracle-database/12.2/adjsn/indexes-for-json-data.html
  https://oracle-base.com/articles/12c/indexing-json-data-in-oracle-database-12cr1
the entire contents of each of which are incorporated herein by this reference.

In one implementation, each source-specific search index includes:
  an inverted text index which tokenizes the data from an indexed source into words and includes an indication of the "documents" in which each word occurs (e.g., an index entry for the word "article" may indicate that the word "article" appears in document numbers 1, 5, 7, 8, and 9)
  index structures (e.g., B-trees, functional indexes, binary indexes) for point lookups or range-based searches (e.g. for answering queries such as "all cameras with PRICE between $100 and $500)

Significantly, these index structures include values from fields in the source-row that are not in the metadata for the source-row. For example, for a SALES table, an index may be built on the field "date_of_sale", which would not be in part of the metadata that uniquely identifies the row (and therefore not be in the UI table 110). An explanation of how index entries are created for values from the fields that are not present in the UI table 110 shall be described hereafter.

JSON search indexes are designed to output document IDs of the documents that satisfy search queries. However, since index 150 is built on JSON objects that correspond to UI-table rows, a doc_id-to-rowid mapping may be used by database system 100 to translate doc_ids that are output by index 150 to rowids of the corresponding UI-table rows. Thus, depending on the needs of any given query, the result set provided by database system 100 may be:

- The doc_ids, produced by index 150, that satisfy the search criteria
- The rowids of the UI-table rows that correspond to those doc_ids
- The metadata from the UI-table rows that correspond to those doc_ids
- JSON documents built to include data from the source-rows that correspond to those UI-table rows (for queries that are not limited to a single indexed source, a single dynamically-constructed query-result JSON document may include content from multiple indexes sources)
- Those JSON documents after further filtering and/or manipulation (e.g., the database system 100 may apply JSON operators on top of JSON documents built by the JSON constructor 140 in response to a query)

One implementation of ubiquitous index 150 is illustrated in FIG. 3. Referring to FIG. 3, it illustrates an implementation where each partition of UI table 110 has its own JSON search index within index 150. Because the partitions of UI table 110 are source-specific, the JSON search indexes that comprise index 150 are also source-specific.

In the illustrated implementation, index 150 includes source-specific indexes 310, 312 and 314. Index 310 is built on partition 300, and therefore indexes the content of table 200. Index 312 is built on partition 302, and therefore indexes the content of external table 212. Index 314 is built on partition 304, and therefore indexes the content of view 206.

Ubiquitous index 150 may have any number of source-specific indexes for each indexed source. The number and type of indexes for any given indexed source may vary based on the types of searches that will be supported for the source. According to one implementation, ubiquitous index 150 includes, among other possible types of indexes, at least one JSON search index for each indexed source. The creation and use of such source-specific JSON search indexes shall now be described in greater detail.

One benefit of representing source-rows as JSON objects is to remove search restrictions imposed by the datatype associated with the indexed fields. For example, the underlying datatype for a "date" field in one source may differ from the underlying datatype of a "date" field in another source. However, once indexed as JSON objects, the ubiquitous index 150 may be used to simultaneously search the "date" fields of both sources for a particular date (or range of dates), without regard to the underlying datatypes in the indexed sources.

The JSON Constructor: Creating JSON Objects for Source-Rows

Unfortunately, because the rows in UI table 110 only contain the metadata for the source-rows, UI table 110 does not have all of the information needed to index the indexed sources. For example, assume that table 200 includes, in addition to a cust_id column, a first_name column ("FIRST") and a last_name column ("LAST"). It may be desirable to index values from these additional columns to be able to handle searches that request all source-rows where FIRST="Fred", or where LAST="Johnson". Without the values from "FIRST" and "LAST" columns of table 200, index 310 could not be used to answer such queries.

Therefore, to obtain values needed to index "additional fields" of indexed source, the metadata for each source-row of the indexed source is fed to JSON constructor 140. JSON constructor 140 uses the metadata for each source-row to obtain the values of the additional fields of the source-row (e.g., the value the source-row has for the "FIRST" column) from the indexed source, and creates a JSON object for the source-row. The JSON object that is produced by JSON constructor 140 for each source-row includes both the metadata for the source-row (also contained in METADATA column of UI table 110), and the values of the additional fields of the source-row that were retrieved by JSON constructor 140 from the indexed source.

As an example, assume that JSON constructor 140 receives the following metadata for a particular source-row in table 200:

{"owner" : "CUSTOMER", "source" : "CUSTOMERS", "key" : {"cust_id" = 1}}.

In response to receiving this metadata, JSON constructor 140 may use the metadata to retrieve, from table 200, the additional values contained in the particular source-row (the row where "cust_id"=1). For example, JSON constructor 140 may retrieve the row that corresponds to the metadata from table 200 to determine that the "FIRST" column of the row has the value "Eric", and the "LAST" column of the row has the value "Cartman". Based on this information, JSON constructor 140 may generate the following JSON object:

{"CUSTOMER":{"CUSTOMERS":{"CUST_ID":1,"FIRST":"Eric","LAST":"Cartman"}}}

The format of this JSON object is the owner id (i.e., "CUSTOMER"), followed by the source id (the table name "CUSTOMERS"), followed by a series of key/value pairs, where the keys correspond to column names and the values are the values, contained in the source-row, for those columns. In the present example, the three key/value pairs are:

Key: CUST_ID, Value: 1
Key: FIRST, Value: Eric
Key LAST, Value: Cartman

The type and number of keys that are indexed for any given indexed source may vary. For example, source-rows from external table 212 may not even have values for "FIRST" and "LAST" keys, but may instead have keys such as "FILENAME" and "MODIFICATION DATE".

Once a JSON object is created by JSON constructor 140 of a given source-row of a given source, the database system 100 updates the source-specific index of the given source based on the JSON object. For example, assume that source-row associated with the JSON object specified above is established as "document 1" of the JSON search index for the CUSTOMER table. Under these conditions, the JSON search index for the CUSTOMER table may be updated with an entry that indicates that the word "Eric" is in document 1, and with an entry that indicates that the word "Cartman" is in document 1. A document-to-rowid mapping may be used to establish the association between "document 1" and the row, within the UI table 110, that corresponds to the source-row that produced the JSON object that is treated as "document 1".

Assume that a different source-row of the CUSTOMER table is assigned "document ID 4". If that source-row also has "Eric" in the firstname field, then the index entry for the word "Eric" (in the source-specific index for CUSTOMER) would be updated to include both document identifiers (e.g., "Eric 1, 4).

The Path Key

According to one implementation, every source-row is treated as having an implicit key referred to herein as "PATH". The value for the "PATH" key comes from the metadata that specifies the source. In the present example, the source associated with the JSON object: {"CUSTOMER":{"CUSTOMERS":{"CUST_ID":1,"FIRST": "Eric","LAST":"Cartman"}}} is identified by the owner value "CUSTOMER" and the source id value "CUSTOMERS". Consequently, the value for the "PATH" key for this source row is "customer.customers".

In one implementation, rather than indexing the values of the path key separately, the path value associated with a source-row is prepended to the values for all other keys of the source-row prior to indexing those values. In the present example, the key/value pairs to be indexed for the source row then become:

Key: CUST_ID, Value: customer.customers.1

Key: FIRST, Value: customer.customers.Eric

Key LAST, Value: customer.customers.Cartman

Maintaining the Ubiquitous Index Based on JSON Objects

Once JSON constructor 140 has constructed the JSON object for a source-row, the ubiquitous index 150 is updated to index the row based on the content of the JSON object. For the purpose of illustrations, it shall be assumed that index 310 is a JSON search index built on partition 300 (therefore reflecting the contents of table 200). In this example, the index 300 is updated using the information in this JSON object so that the particular row may be found using index 310.

Working Example of a Database System With a Ubiquitous Index

For the purpose of explanation, it shall be assumed that an application user has an inventory of purchase orders. The database has five tables with primary-foreign key relationships as follows, Customers (Primary Key: CUST_ID), Orders (Primary Key: ORDER_ID, Foreign Key: CUST_ID), Items (ITEM_ID), Line Items (Foreign Key: ORDER_ID, ITEM_ID). Use of the ubiquitous index shall be described with examples given for each of the following five activities:

Creating a view of that joins the five tables into a view that reflects the format against which the user would like to search Creating a ubiquitous search index to be used to facilitate the searching Add sources to be indexed by the ubiquitous search index Execute DMLs against the indexed sources (or base tables to the indexed sources)

Issue queries that may be answered by the database system using the ubiquitous search index Creating a View to be Indexed As mentioned above, the ubiquitous index may index unmaterialized views, among other things. Therefore, if a user would like to run searches against a particular format/organization of data, the user may create an unmaterialized view in which the desired data is organized in the desired format. For example, a user "CUSTOMER" may create a view as follows:

```
CREATE OR REPLACE VIEW SEARCH_VIEW ((cust_id, business_object,
    CONSTRAINT search_view_pk
      PRIMARY KEY (cust_id)
        RELY DISABLE NOVALIDATE,
    CONSTRAINT search_view_fk
      FOREIGN KEY (cust_id) REFERENCES customers(cust_id)
        DISABLE NOVALIDATE) AS
SELECT c.cust_id, JSON_OBJECT (
        'id' VALUE c.cust_id,
        'name' VALUE (c.first || ' ' || c.last),
        'num_orders' VALUE (
          SELECT COUNT(*)
          FROM orders o
          WHERE o.cust_id = c.cust_id),
        'orders' VALUE (
          SELECT JSON_ARRAYAGG(
            JSON_OBJECT(
              'order_id' VALUE o.order_id,
              'items' VALUE (
                SELECT JSON_ARRAYAGG (
                  JSON_OBJECT(
                    'id' VALUE l.item_id,
                    'name' VALUE i.name,
                    'quantity' VALUE l.quantity,
                    'single_item_price' VALUE i.price,
                    'total_price' VALUE (i.price * l.quantity)))
```

```
            FROM lineitems l, items i
            WHERE l.order_id = o.order_id
            AND i.item_id = l.item_id)))
      FROM orders o
      WHERE o.cust_id = c.cust_id) ABSENT ON NULL RETURNING JSON) business_object
FROM customers c;
CREATING THE UBIQUITOUS SEARCH INDEX
```

Before a view can be indexed by a ubiquitous index, the ubiquitous index must be created. In one implementation, the user creates a Ubiquitous Search Index using the following command:
    EXEC DBMS_SEARCH.CREATE_INDEX ('SEARCH_INDEX');

In the example given above, a ubiquitous search index named 'SEARCH_INDEX' is created using a "DBMS_SEARCH.CREATE_INDEX" API. In response to this command, the database server creates both a UI table and a JSON search index.

In one implementation, the table (named "SEARCH_INDEX") is created with two JSON columns ("METADATA" and "DATA") and two virtual varchar columns ("OWNER" and "SOURCE"). The OWNER and SOURCE columns are the columns by which the UI table is partitioned. The explanation of how each column is used will be described in greater detail hereafter.

In one implementation, the JSON Search Index that is created in response to the CREATE_INDEX command is created on top of the DATA column using a module such as JSON_CONSTRUCTOR 140, with full-text search as well as range-search enabled for all fields of the JSON.

Adding Sources to the Index

Once the ubiquitous index is created, the user may add any number and type of sources to the ubiquitous index.

According to one implementation, this is performed by calling a DBMS_SEARCH.ADD_SOURCE procedure. For the purpose of illustration, it shall be assumed that the user desires to be able to use the index to search both the CUSTOMERS table itself, and to search the SEARCH_VIEW view that was created in the example given above.

According to one implementation, the CUSTOMERS table can be added to the index using the command:
    EXEC DBMS_SEARCH.ADD_SOURCE ('SEARCH_INDEX','CUSTOMERS');

Similarly, the view can be added to the index using the command:
    EXEC DBMS_SEARCH.ADD_SOURCE ('SEARCH_INDEX','SEARCH_VIEW');

In one implementation, the database system performs the following operations in response to these commands:
- Creates a partition of a source-row queue 112 for each source.
- Adds a Partition to the SEARCH_INDEX Table for each unique data source (e.g., OWNER/SOURCE_NAME combination)
- For each source-row of the source at the time the source is added to the index, the database system adds a JSON METADATA Entry to the SEARCH_INDEX Table of the form:

```
{ "OWNER" : <OWNER>, "SOURCE" : <SOURCE>, "KEY" : { <PK_i> : <PK_VAL_i> , ... }
}
``` where PK_i is the ith column part of a primary key of the data source. For example:
- {"OWNER":"CUSTOMER","SOURCE":"CUSTOMERS","KEY":{"CUST_ID":1}} signifies a row from source table 'CUSTOMERS'
- {"OWNER":"CUSTOMER","SOURCE":"SEARCH_VIEW","KEY":{"CUST_ID":1}} signifies a row from source "SEARCH_VIEW"
- If the source being added is a view, detect all the database tables that participate in a View Definition along with their relationships to each other using their Primary-Foreign Key Graph and creates DML Triggers/Sets up DML Callbacks on each of them.
- Each trigger computes which Primary Key Value of the View are affected by the DML happening on each row of the current table, and then inserts that METADATA Entry into the Source Row Queue for this Data Source.
- SYNC the Json Search INDEX to update it to have the data indexed for this Data Source. The SYNC Index API internally invokes the JSON_CONSTRUCTOR which fetches the METADATA from SEARCH_INDEX Table, fetches the corresponding row from the actual Data Source, in this case, 'CUSTOMERS' and 'SEARCH_VIEW' and then transforms it into a JSON Document of the following form:

```
{ "<SOURCE_OWNER>" :{ "<SOURCE_NAME>" : { ... <COLUMN_i> : <COLUMN_i_VALUE>, ...
} }}
```

For example, for a source-row of the customers table data source with cust_id 1, the JSON constructor 140 produces the JSON object as follows:

```
{"CUSTOMER":{"CUSTOMERS":{"CUST_ID":1,"FIRST":"Eric","LAST":"Cartman"}}}
```

Creates a background job for this Data Source (e.g. a job in SYNC_INDEX module 120) which dequeues rows from the source-row queue in batches, refreshes the SEARCH_INDEX table by inserting/deleting/updating that row from it based on the kind of DML to be performed, followed by calling SYNC_INDEX on the JSON Search Index to update the index with the latest changes, hence ensuring eventual consistency.

Keeping the Ubiquitous Index in SYNC

As explained above, adding sources to an index involves indexing each source at the time the source is added to the ubiquitous index. After this process, the ubiquitous index will reflect the indexed source as of the time the source was added. However, the user can continue to issue regular DMLs to all the component tables. For the ubiquitous index to stay eventually consistent with the indexed sources, these changes need to be captured and reflected in the ubiquitous index.

According to one implementation, this eventual consistency is achieved through the use of an internal framework of triggers (metadata extractor 130), queues (source-row queue 112) and jobs (sync module 120) which automatically eventually refresh the search index. The components involved in the synchronization process have been described elsewhere herein.

Database systems do not generally support triggers on external sources, such as remote data store 210. The more dynamic the external source, the more important it is to support eventual synchronization. In one implementation, synchronization may be achieved by periodically dropping an external source from the ubiquitous index, and then re-adding the external source. When re-added, the database system 110 will once again pull all of the source-rows from the external source, store the metadata for each in the UI table, create a JSON object for each source-row (which will reflect the current state of the external source), and index those JSON objects using a JSON search index.

In an alternative implementation, a tool may monitor an external source for changes in a manner similar to the monitoring that is performed by the database system 100 based on DML triggers. Such a monitoring tool may submit, to source-row queue 112, the metadata of all source-rows that undergo changes. Based on the queue entries thus created, the ubiquitous index 150 may be updated in a manner similar to the operations described herein for updating the ubiquitous index 150 based on the triggers created for internal sources.

Using the Ubiquitous Index to Answer Queries

Once a source has been added to the ubiquitous index, the database system can start using the ubiquitous index to answer queries that target the source. According to one implementation, database system 100 supports using the ubiquitous index to answer many different types of queries, including both SQL queries and NoSQL style queries.

With respect to SQL queries, the ubiquitous search index may be used to process SQL using SQL/JSON and CONTAINS queries. An example of a command that performs a ubiquitous search across sources using CONTAINS is:

SELECT METADATA FROM CUSTOMER.SEARCH_INDEX
WHERE CONTAINS(DATA, 'Alex or Saurabh')>0;

Example 1: Query with No Source Restrictions

This search has no condition that limits the sources. Therefore, the search will be performed across all indexed sources. When the search involves multiple sources, the database system 100 may search, in parallel, the source-specific indexes of each source involved in the search. Thus, in the present example, this search query can cause source-specific indexes 310, 312 and 314 to be searched in parallel. After performing multi-source searches, the database system 100 combines the outputs from each of the source-specific indexes. This consolidated output may be provided to answer the query, or may be subject to further processing based on the needs of the query.

Further, the ubiquitous search index may be used to search a specific source using single partition pruning based on a JSON_TEXTCONTAINS condition, as follows:

```
SELECT METADATA FROM CUSTOMER.SEARCH_INDEX WHERE
JSON_TEXTCONTAINS(DATA,
    '$.CUSTOMER.SEARCH_VIEW.BUSINESS_OBJECT.name', 'Alex or Saurabh') AND
    OWNER = 'CUSTOMER' AND SOURCE = 'SEARCH_VIEW';
```

Example 2: Query with Both Path and Source Restrictions

In this example, the conditions "OWNER='CUSTOMER' AND SOURCE='SEARCH_VIEW'" limit the search to a single indexed source. Consequently, only the source-specific index for that source will be searched when the database system 100 executes the query. Also in this example, the search is limited to the particular path '$.CUSTOMER.SEARCH_VIEW.BUSINESS_OBJECT.name'. As a result, source-rows from SEARCH_VIEW will not satisfy the search conditions unless the rows have the name 'Alex' or the name 'Saurabh' associated with the specific path "$.CUSTOMER.SEARCH_VIEW.BUSINESS_OBJECT.name".

Similarly, any SQL JSON combinations of JSON_EXISTS, JSON_TEXTCONTAINS, JSON_VALUE and so on can be used for ubiquitous search to answer complex queries within a single index access.

With respect to NoSQL style queries, one implementation provides a DBMS_SEARCH.FIND API that allows the ubiquitous index to be used with NoSQL Style Oracle SODA QBE. Oracle SODA QBE is described in docs.oracle.com/en/database/oracle/simple-oracle-document-access/adsdi/overview-soda-filter-specifications-qbes.html, the entire contents of which is incorporated herein by this reference.

Further, a user can create a REST API on top of this API for the corresponding application. In addition, the database system may provide REST Wrappers on top of this API. In one implementation, the Oracle SODA QBE Syntax supported by DBMS_SEARCH.FIND API is the same as supported by CTX_QUERY.RESULT_SET API, which is described at docs.oracle.com/en/database/oracle/oracle-database/21/ccref/CTX_QUERY-package.html, the entire contents of which is incorporated herein by this reference.

An example of a query in this format is as follows:

```
SELECT JSON_SERIALIZE(DBMS_SEARCH.FIND('CUSTOMER.SEARCH_INDEX',
JSON('{
  "$query" : { "CUSTOMER.SEARCH_VIEW.*" : { "$contains" : "Gun or patrol costume" } },
  "$facet" : [
    { "$sum" : "CUSTOMER.SEARCH_VIEW.BUSINESS_OBJECT.orders.items.total_price"},
    { "$count" :
      {                                    "path"
"CUSTOMER.SEARCH_VIEW.BUSINESS_OBJECT.orders.items.single_item_price",
        "bucket" : [ { "$lt" : 20 }, { "$gte" : 20 } ] } },
    { "$uniqueCount" : "CUSTOMER.SEARCH_VIEW.BUSINESS_OBJECT.name" } ]
}')) PRETTY) FROM DUAL;
```

Example 3: Search Using Soda Qbe Syntax

The SODA QBE SYNTAX allows aggregation, and when used in conjunction with the ubiquitous index 150 allows a single query to aggregate data obtained from source-rows that originate from heterogeneous sources. For example, a "sum" may be computed based on price values from source-rows that originated in table 200, price values from source-rows that originated in view 206, and price values from source-rows that originated in remote data store 210.

Scoring

Some queries require the database server to "score" the search results. For example, certain searches may request the search results to be ordered based on relevancy, or for the search results to only include the "top 10" most relevant search results. In each of these cases, the database server must score/rank the search results.

When multiple heterogenous sources are involved, scoring can be complicated. The scoring algorithm used to rank results from one source may be different from those used to rank results from another source. This makes it difficult to rank results from mixed sources relative to each other. However, when such heterogenous sources are indexed in a ubiquitous index as described herein, scoring is uniform across all sources. That is, the scoring algorithm used by the database system 100 to score search results (typically based on term frequency) is source-agnostic, and therefore does not change based on the source from which the data originated.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
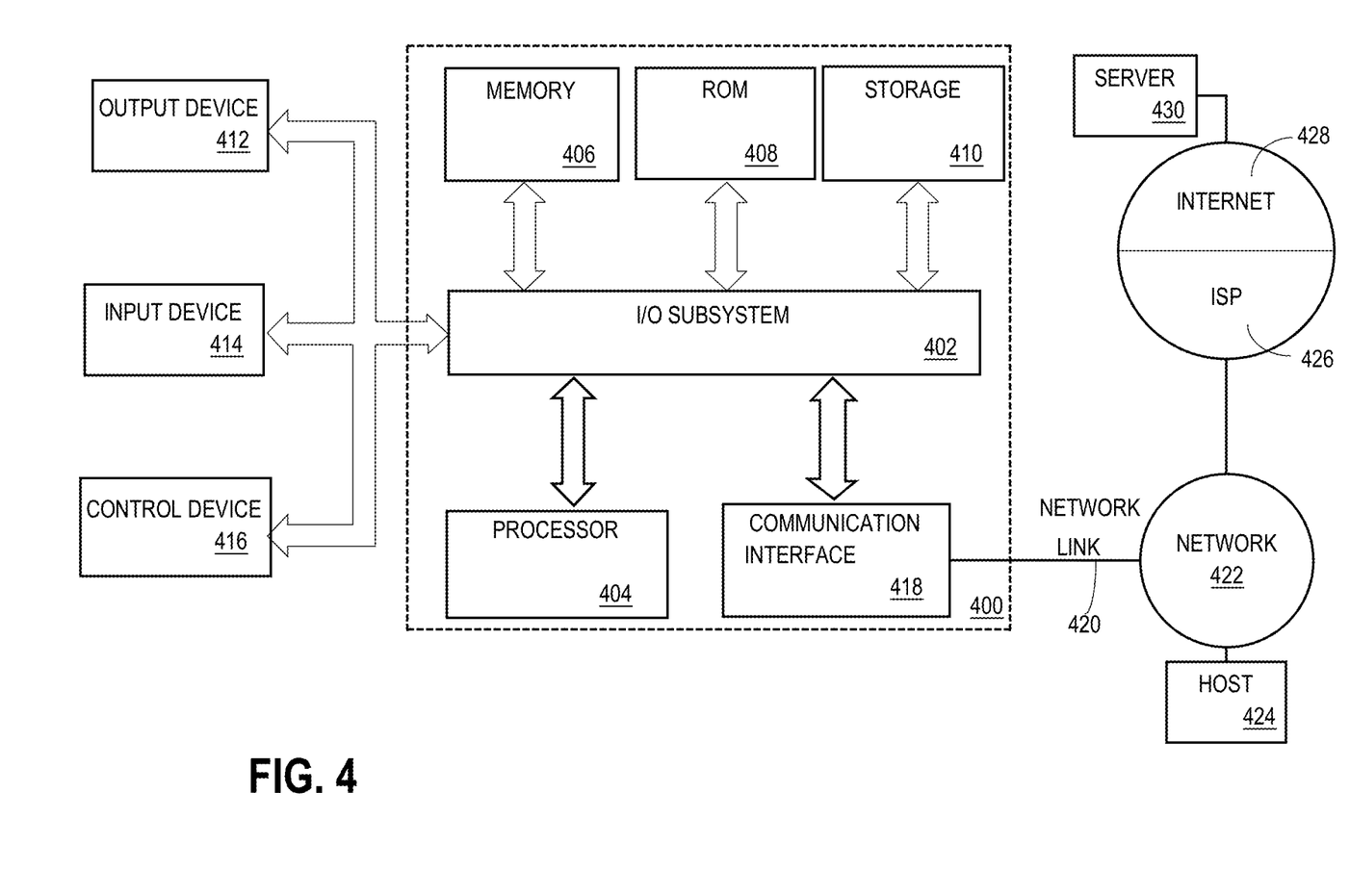
FIG. 4 is a block diagram of a computer system upon which the techniques described herein may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing, in a database managed by a database server, a view definition of an unmaterialized view;
   wherein the view definition of the unmaterialized view specifies a join between two or more base tables;
   wherein the database does not store, separate from the two or more base tables, any copy of data from the two or more base tables for the unmaterialized view;
   based on the view definition, determining data for source-rows of the unmaterialized view;
   creating, within the database, an index that indexes the source-rows of the unmaterialized view based on the data determined for the source-rows of the unmaterialized view; and
   using the index to answer queries that target the unmaterialized view;
   wherein the method is performed by one or more computing devices.

2. The method of claim 1 wherein:
   determining data for the source-rows of the unmaterialized view includes generating a Javascript Object Notation (JSON) object for each source-row of the unmaterialized view; and
   creating the index includes creating a JSON search index based on the JSON objects generated for the source-rows of the unmaterialized view.

3. The method of claim 1 further comprising:
   creating a ubiquitous index table (UI-table) that includes a UI-table row for each source-row of the unmaterialized view; and wherein the UI-table row for a given source row of the unmaterialized view includes metadata that uniquely identifies a source/source-row combination of the given source row of the unmaterialized view.

4. The method of claim 3 wherein creating the index includes:
causing a Javascript Object Notation (JSON) constructor to generate a JSON object for each source-row of the unmaterialized view by:
obtaining the metadata that uniquely identifies a source/source-row combination of each source-row of the unmaterialized view;
based on the metadata, obtaining from the two or more base tables, values for one or more fields of the source-row; and
generating the JSON object that includes both the metadata and the values for the one or more fields; and
updating the index to reflect the values for the one or more fields of the JSON object of each source-row.

5. The method of claim 1 further comprising:
creating triggers on the two or more base tables; and
wherein the triggers cause the index to be updated to reflect changes made by Data Manipulation Language (DML) operations, performed on the two or more base tables, that affect contents of the unmaterialized view.

6. A method comprising:
creating, within a database, a ubiquitous index;
wherein creating the ubiquitous index includes:
for each source of a plurality of sources, obtaining metadata that uniquely identifies source-rows in the source;
storing, in a ubiquitous index table (UI-table), a UI-table row for each source-row of each source of the plurality of sources;
wherein the UI-table row for a given source-row of a given source holds in a column of the UI-table a Javascript Object Notation (JSON) object that includes:
the metadata that uniquely identifies the given source-row of the given source and
values, obtained from the source associated with the UI-table row, for one or more fields;
updating the ubiquitous index to reflect the values for the one or more fields for the JSON object generated for each UI-table row;
receiving a query that targets one or more of the plurality of sources; and
using the ubiquitous index to determine a result set for the query;
wherein the method is performed by one or more computing devices.

7. The method of claim 6 further comprising partitioning the ubiquitous index table into a plurality of partitions, wherein each partition of the plurality of partitions corresponds to a distinct source of the plurality of sources and stores the UI-table rows that correspond to the source-rows of the corresponding source.

8. The method of claim 7 wherein:
the ubiquitous index includes a collection of JSON search indexes; and
each JSON search index indexes a distinct partition of the plurality of partitions of the ubiquitous index table.

9. The method of claim 6 wherein the plurality of sources includes an external source that is represented, within the database, as an external table.

10. The method of claim 6 wherein the plurality of sources includes an unmaterialized view.

11. One or more non-transitory computer-readable media storing instructions which, when executed by one or more computing devices, cause:
storing, in a database managed by a database server, a view definition of an unmaterialized view;
wherein the view definition of the unmaterialized view specifies a join between two or more base tables;
wherein the database does not store, separate from the two or more base tables, any copy of data from the two or more base tables for the unmaterialized view;
based on the view definition, determining data for source-rows of the unmaterialized view;
creating, within the database, an index that indexes the source-rows of the unmaterialized view based on the data determined for the source-rows of the unmaterialized view; and
using the index to answer queries that target the unmaterialized view.

12. The one or more non-transitory computer-readable media of claim 11 wherein:
determining data for the source-rows of the unmaterialized view includes generating a Javascript Object Notation (JSON) object for each source-row of the unmaterialized view; and
creating the index includes creating a JSON search index based on the JSON objects generated for the source-rows of the unmaterialized view.

13. The one or more non-transitory computer-readable media of claim 11 further comprising instructions for:
creating a ubiquitous index table (UI-table) that includes a UI-table row for each source-row of the unmaterialized view; and
wherein the UI-table row for a given source row of the unmaterialized view includes metadata that uniquely identifies a source/source-row combination of the given source row of the unmaterialized view.

14. The one or more non-transitory computer-readable media of claim 13 wherein creating the index includes:
causing a Javascript Object Notation (JSON) constructor to generate a JSON object for each source-row of the unmaterialized view by:
obtaining the metadata that uniquely identifies a source/source-row combination of each source-row of the unmaterialized view;
based on the metadata, obtaining from the two or more base tables, values for one or more fields of the source-row; and
generating the JSON object that includes both the metadata and the values for the one or more fields; and
updating the index to reflect the values for the one or more fields of the JSON object of each source-row.

15. The one or more non-transitory computer-readable media of claim 11 further comprising instructions for:
creating triggers on the two or more base tables; and
wherein the triggers cause the index to be updated to reflect changes made by Data Manipulation Language (DML) operations, performed on the two or more base tables, that affect contents of the unmaterialized view.

16. One or more non-transitory computer-readable media storing instructions which, when executed by one or more computing devices, cause:
creating, within a database, a ubiquitous index;
wherein creating the ubiquitous index includes:

for each source of a plurality of sources, obtaining metadata that uniquely identifies source-rows in the source;

storing, in a ubiquitous index table (UI-table), a UI-table row for each source-row of each source of the plurality of sources;

wherein the UI-table row for a given source-row of a given source holds in a column of the UI-table a Javascript Object Notation (JSON) object that includes:

the metadata that uniquely identifies the given source-row of the given source and values, obtained from the source associated with the UI-table row, for one or more fields;

updating the ubiquitous index to reflect the values for the one or more fields for the JSON object generated for each UI-table row;

receiving a query that targets one or more of the plurality of sources; and using the ubiquitous index to determine a result set for the query.

17. The one or more non-transitory computer-readable media of claim 16 further comprising instructions for partitioning the ubiquitous index table into a plurality of partitions, wherein each partition of the plurality of partitions corresponds to a distinct source of the plurality of sources and stores the UI-table rows that correspond to the source-rows of the corresponding source.

18. The one or more non-transitory computer-readable media of claim 17 wherein:

the ubiquitous index includes a collection of JSON search indexes; and each JSON search index indexes a distinct partition of the plurality of partitions of the ubiquitous index table.

19. The one or more non-transitory computer-readable media of claim 16 wherein the plurality of sources includes an external source that is represented, within the database, as an external table.

20. The one or more non-transitory computer-readable media of claim 16 wherein the plurality of sources includes an unmaterialized view.

* * * * *

UNITED STATES PATENT AND TRADEMARK OFFICE
CERTIFICATE OF CORRECTION

PATENT NO. : 12,271,378 B2  
APPLICATION NO. : 18/367722  
DATED : April 8, 2025  
INVENTOR(S) : Netravalkar et al.

Page 1 of 1

It is certified that error appears in the above-identified patent and that said Letters Patent is hereby corrected as shown below:

In the Claims

In Column 21, Line 42, in Claim 6, delete "source" and insert -- source, --, therefor.

In Column 23, Line 12, in Claim 16, delete "source" and insert -- source, --, therefor.

Signed and Sealed this  
First Day of July, 2025

Coke Morgan Stewart  
*Acting Director of the United States Patent and Trademark Office*